US012731113B1

(12) United States Patent
Beecham

(10) Patent No.: US 12,731,113 B1
(45) Date of Patent: Sep. 8, 2026

(54) SYSTEM AND METHOD FOR REAL TIME ADAPTIVE PRICE BAND COEFFICIENT CONTROL IN A HYBRID FIAT CRYPTOCURRENCY COMMERCE NETWORK

(71) Applicant: James E. Beecham, West Palm Beach, FL (US)

(72) Inventor: James E. Beecham, West Palm Beach, FL (US)

( * ) Notice: Subject to any disclaimer, the term of this patent is extended or adjusted under 35 U.S.C. 154(b) by 0 days.

(21) Appl. No.: 19/397,886

(22) Filed: Nov. 22, 2025

Related U.S. Application Data

(63) Continuation-in-part of application No. 19/384,876, filed on Nov. 10, 2025.

(51) Int. Cl.
*G06Q 20/06* (2012.01)
*G06Q 20/38* (2012.01)
*G06Q 30/0201* (2023.01)

(52) U.S. Cl.
CPC ....... *G06Q 20/0655* (2013.01); *G06Q 20/381* (2013.01); *G06Q 30/0206* (2013.01); *G06Q 2220/00* (2013.01)

(58) Field of Classification Search
None
See application file for complete search history.

(56) References Cited

U.S. PATENT DOCUMENTS 11,151,549 B2 * 10/2021 Ehrlich-Quinn ..... G06Q 20/326
11,625,785 B2 * 4/2023 Ayikara Kizhakayil ..................... G06Q 40/06 705/76
12,361,406 B2 * 7/2025 Hertzog ................ H04L 9/3239
2022/0188781 A1 * 6/2022 El-Bizri ............. G06Q 20/3678
2024/0420114 A1 * 12/2024 Watt ....................... G06Q 50/16

FOREIGN PATENT DOCUMENTS

DE 4605876 A1 * 10/2023 ............ G06Q 20/06

* cited by examiner

*Primary Examiner* — Paul S Schwarzenberg
(74) *Attorney, Agent, or Firm* — Christopher Pilling

(57) ABSTRACT

A computer-implemented system and method are disclosed for maintaining equilibrium in hybrid fiat-and-cryptocurrency transactions through real-time adaptive coefficient control. The invention features an Adaptive Coefficient Controller (ACC) that dynamically adjusts dual control factors—r(t) and β(t)—within a programmed price-band formula to stabilize valuation between fiat and capped-supply cryptocurrency. Data inputs from a Discount-Satisfaction Monitoring (DSM) subsystem, an AI-Monitored Supply-Chain (AMSC) subsystem, and user-onboarding metrics enable continuous recalibration of the price-band slope and sensitivity. When market or behavioral deviations occur, the ACC autonomously modifies r(t) and β(t), records adjustments on a blockchain ledger, and triggers coupon or incentive issuance to sustain transactional balance. In some embodiments, user-buyers holding cryptocurrency tokens over time achieve compounded "relative discounts" when applying such tokens to hybrid purchase offers, as the appreciated token value effectively multiplies purchasing power.

2 Claims, 12 Drawing Sheets

System Architecture ofter Adaptive-Price-Band Control Environment

Discount-Satisfaction Monitoring (DSM) subsystem showing user feedback and satisfaction analytics adjusting r(t) coefficient in the price-band equation Marketplace escrow, vendor search and coefficient- linked offer logic Offers dynamically adjusted via r(t) and β(t)

User and Vendor Onboarding and Wallet integration
Flow showing authentication, wallet linking, ad offer participation influencing β (t)

User and vendor onboarding events update β(t) based on wallet activity; verified used increases adaptive weighting within Hybrid Control System.

SYSTEM AND METHOD FOR REAL TIME ADAPTIVE PRICE BAND COEFFICIENT CONTROL IN A HYBRID FIAT CRYPTOCURRENCY COMMERCE NETWORK

CROSS-REFERENCE TO RELATED APPLICATIONS

This application is a Continuation-in-Part of U.S. patent application Ser. No. 19/384,876, filed Nov. 10, 2025, titled "System and Method for Cryptocurrency-Facilitated Asset Holding and Transaction with Value Appreciation Mechanism within a Fiduciary-Maintained Marketplace." The entire contents of that application are hereby incorporated by reference in their entirety. This CIP introduces real-time adaptive coefficient control and AI-governed feedback loops for hybrid fiat-and-cryptocurrency commerce networks.

FIELD OF THE INVENTION

The present invention relates generally to electronic payment systems utilizing both fiat currency and blockchain-based cryptocurrency, and more particularly to systems and methods for adaptive, data-driven control of price-band coefficients in hybrid commerce environments. The invention spans financial technology, distributed-ledger systems, and machine-learning-based control of token valuation within marketplaces that use mixed fiat and crypto transactions.

BACKGROUND OF THE INVENTION

Early hybrid payment systems enabled consumers to pay partly in fiat currency and partly in cryptocurrency tokens. However, such systems lacked dynamic mechanisms to stabilize perceived fairness between fiat and crypto components. As adoption grew, imbalances emerged: (1) excessive appreciation of capped-supply tokens discouraged vendor acceptance, and (2) excessive fiat weighting diluted user incentives. The parent application (filed Nov. 10 2025) introduced price-band logic establishing upper and lower bounds to maintain transactional parity. The present continuation-in-part extends that framework by introducing real-time adaptive control coefficients ($r(t)$ and $\beta(t)$) that autonomously adjust token-to-fiat weighting based on market feedback, redemption rates, supply-chain adoption, and user growth metrics.

Comparison with Private Credit Systems

In some commercial environments, large enterprises have experimented with private credit-issuance systems through which suppliers are compensated not with immediate cash, but with platform-issued electronic IOUs, deferred-settlement certificates, or digital credit instruments. These private credit systems are designed to extend the enterprise's own payment cycle and thereby reduce the enterprise's short-term financing costs. A known example involves the issuance of digital supplier credits within a closed platform, wherein suppliers are required to accept such credits in lieu of immediate fiat payment and may only redeem or discount such credits at a later time or through designated intermediaries. Although such mechanisms may temporarily reduce the primary enterprise's cash-flow burden, they create long settlement delays, shift working-capital pressure onto smaller suppliers, and introduce opacity regarding the enterprise's true liabilities. Furthermore, regulatory authorities have increasingly scrutinized such arrangements because they may constitute de-facto debt instruments or non-compliant negotiable obligations outside of established banking-law frameworks.

The present invention expressly avoids the shortcomings of private IOU-based supplier credit systems. Under the hybrid payment method described herein, no delayed-settlement IOU, credit certificate, or enterprise-issued debt obligation is generated. Instead, each transaction is settled immediately using two complementary payment components: (1) a fiat-currency portion that is transferred directly to the vendor at the time of purchase, and (2) a cryptocurrency-token portion that is also transferred to the vendor contemporaneously, the value of which is established by a programmed price-band midpoint $P(t)$ that is transparent to all participants. This structure provides the vendor with immediate liquidity—both in fiat and in tokens—without extending, disguising, or deferring the vendor's receivable period.

Because the vendor receives full settlement at the moment of purchase, the system does not create supplier-financing risk, does not generate off-balance-sheet liabilities, and does not impose extended payment terms hidden within digital credit systems. The hybrid settlement approach therefore reduces the need for short-term external financing in a manner fundamentally distinct from IOU-based systems. The improvement arises from the fact that the vendor may elect to (a) convert tokens to fiat immediately, (b) hold tokens as appreciating assets according to the programmed price-band mechanism, or (c) transfer tokens upstream to that vendor's suppliers, thereby extending the liquidity benefits through the manufacturing or distribution chain without imposing any forced credit burden on any participant.

Moreover, because all settlement occurs in real time and is governed by transparent programmatic rules, the system preserves regulatory clarity and avoids the compliance concerns associated with private-credit arrangements. The system's design ensures that the hybrid payment does not constitute a negotiable instrument, debt note, promise to pay, or delayed settlement obligation. Instead, it provides a voluntary, market-driven mechanism whereby buyer-users allocate a portion of the purchase consideration in cryptocurrency tokens whose supply and valuation are managed within a controlled price-band. By enabling full and immediate payment while simultaneously reducing the vendor's reliance on external credit lines, this hybrid method achieves the financing-cost benefits sought in prior private credit systems but without the distortive effects, hidden liabilities, or compliance failures of IOU-based platforms.

Accordingly, the system and method described herein provide a novel and regulatorily advantageous approach to lowering financing costs for businesses. It furnishes vendors and their suppliers with immediate liquidity, programmable asset appreciation potential, and optional upstream transferability, all without extending accounts-payable timelines or introducing non-transparent settlement instruments. This combination of features is not found in known private-credit or deferred-settlement systems and constitutes a significant improvement in the structure and operation of digital-asset-assisted commercial transactions.

As described herein, the system executes the hybrid fiat-and-token settlement immediately at the time of purchase without issuing any credit instrument, deferred-settlement obligation, vendor-payable certificate, or IOU-like construct, including in transactions where a vendor purchases goods or services from a supplier.

Token Circulation and Overhang-Management Mechanisms In various implementations, the system may optionally incorporate mechanisms intended to maintain balanced token circulation and prevent long-term accumulation of high-valuation tokens within user wallets. In some embodiments, such mechanisms can include one or more of: time-based token expiration, partial value decay or demurrage for prolonged inactivity, programmed token retirement or burn operations, token-recycling procedures, or velocity-based incentives that encourage periodic use of tokens within the hybrid payment environment. These features, when present, may be applied generally or conditionally based on system-defined criteria, and are not required in all embodiments. The description of these optional circulation-management techniques is provided to illustrate possible system configurations and does not limit the scope of the invention except to the extent expressly recited in the claims.

Unity of the Invention

In various implementations, the components, modules, and functional elements described herein may be understood as cooperating to support a unified hybrid-settlement architecture. In certain embodiments, the system may utilize both fiat currency and cryptocurrency tokens within a programmatically controlled pricing environment, such as a price-band or other valuation-stabilizing mechanism. The technical processes described in connection with hybrid settlement, vendor-offer construction, administrative oversight, token-flow management, and upstream or downstream commercial transactions can operate together within a common framework and may contribute to a shared technical objective.

In some embodiments, shared operational features such as hybrid value allocation, dynamic pricing logic, settlement execution, or token-acquisition processes may be implemented using coordinated system components. These coordinated elements can support a single overall inventive concept relating to structured hybrid payments and controlled-value digital-asset engagement. While particular modules or features may be described individually, they can function cooperatively and may be regarded as aspects of an integrated system architecture capable of supporting multiple use-case scenarios.

This description is provided for explanatory purposes and does not limit the scope of the claims or require any particular combination of features unless expressly recited in an individual claim.

SUMMARY OF THE INVENTION

The invention provides a hybrid fiat-and-cryptocurrency control architecture enabling real-time adaptive adjustment of valuation coefficients to preserve stability and fairness in token-based commerce. A central Adaptive Coefficient Controller (ACC) receives data from multiple subsystems including: a Discount-Satisfaction Monitoring (DSM) module that gauges redemption efficiency and user response; an AI-Monitored Supply-Chain (AMSC) module that tracks upstream vendor and supplier adoption; a Marketplace Escrow and Vendor Search Engine coordinating hybrid offers; and an Administrative Console with AI Oversight Layer performing slope-based corrections of price-band midpoints. The system continuously computes coefficients $r(t)$ and $\beta(t)$ governing the slope and sensitivity of a dual-factor price-band formula. Adjustments are blockchain-recorded for transparency, with parameters automatically reverted or recalibrated as metrics normalize. The invention therefore extends the parent application by embedding adaptive mathematical control logic and feedback-based token-valuation governance, yielding a self-correcting economic loop for hybrid commerce. In certain embodiments, the C4D system is implemented in a manner consistent with regulatory frameworks governing digital-asset and payment technologies, such that the platform functions as a utility-token commerce environment rather than an investment vehicle. The system's programmable price-band control, user disclosures, and optional AML/KYC features collectively ensure that token usage supports lawful commercial transactions and consumer-discount participation while maintaining transparency and auditability across jurisdictions.

DETAILED DESCRIPTION OF THE INVENTION

The embodiments disclosed herein extend those described in parent Application Ser. No. 19/384,876 by introducing adaptive control mechanisms for continuous real-time tuning of hybrid fiat-and-cryptocurrency transactions. References in the following figures to elements numbered 100-699 correspond to system modules previously described and newly enhanced for adaptive control, including administrative AI feedback, slope-monitoring, and supply-chain balancing functions. For purposes of this specification, the terms "β(t)" and "b(t)" are used interchangeably and refer to the same supply-chain and adoption coefficient within the dual-factor price-band control equation (the 'P' equation: See also below). Any instance of the notation "b(t)" should therefore be understood as representing the coefficient β(t), and both symbols denote the identical functional parameter used by the Adaptive Coefficient Controller (ACC) when computing the hybrid price-band midpoint.

Figure 1:
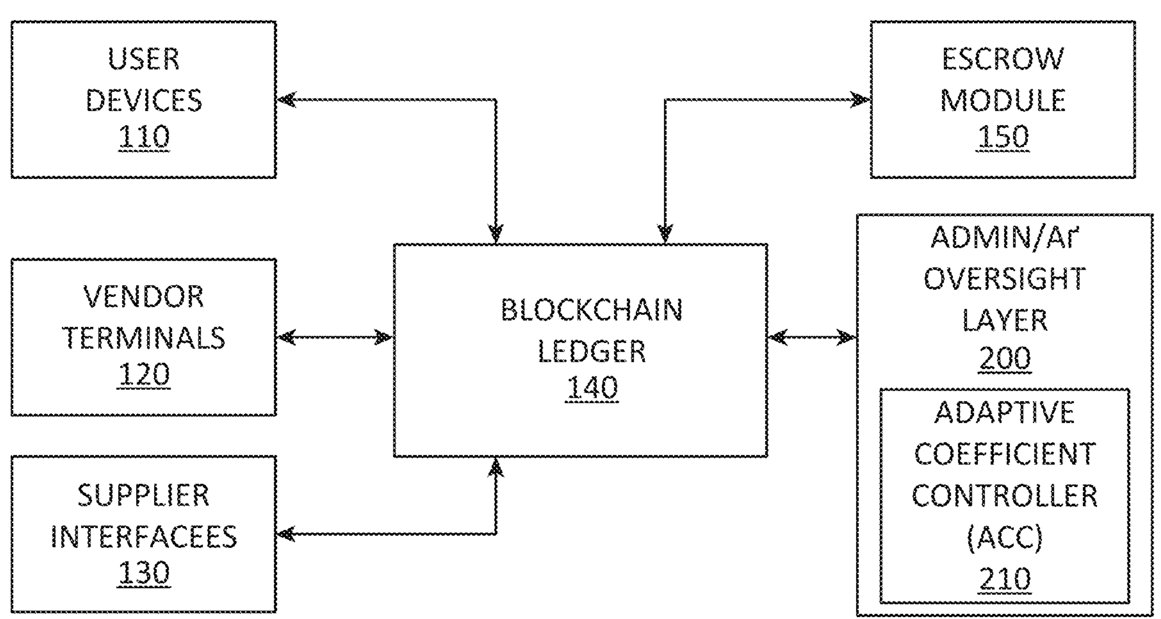
FIG. 1 is a system overview illustrating hybrid fiat-and-cryptocurrency control flow.

FIG. 1 illustrates the overall system architecture integrating hybrid fiat-and-cryptocurrency control elements. User devices 110, vendor terminals 120, and supplier interfaces 130 each communicate with a shared blockchain ledger 140. The ledger 140 records hybrid transactions containing both fiat and capped-supply cryptocurrency components. An escrow module 150 maintains custodial control of tokenized value portions during active transactions, ensuring settlement integrity and compliance verification. The blockchain ledger 140 is further coupled to an administrative/AI oversight layer 200 that includes an Adaptive Coefficient Controller (ACC) 210. The ACC 210 continuously receives transactional, satisfaction, and liquidity data from the connected modules and dynamically adjusts the system's price-band control coefficients r(t) and β(t). This architecture establishes a closed-loop adaptive control environment in which all transactional data, coefficient adjustments, and escrowed value transfers are transparently recorded on-chain for auditability and self-correction.

Multi-Fiat Operation

In various embodiments, the hybrid price-band architecture disclosed herein is expressly configured to operate with any major fiat currency. The Adaptive Coefficient Controller (ACC 210), the price-band equation P(t), and the associated ledger entries may be computed in U.S. dollars, euros, British pounds, Japanese yen, or other nationally recognized fiat units without modification to the underlying dual-factor control logic. Vendors may present hybrid offers denominated in their local fiat currency, and the system automatically aligns the cryptocurrency portion of such offers to the appropriate fiat-equivalent valuation using the current price-band midpoint. In this manner, the invention supports global commercial deployment with seamless operation across multiple fiat systems, while maintaining a unified token-based discount framework independent of any particular national currency.

Figure 2:
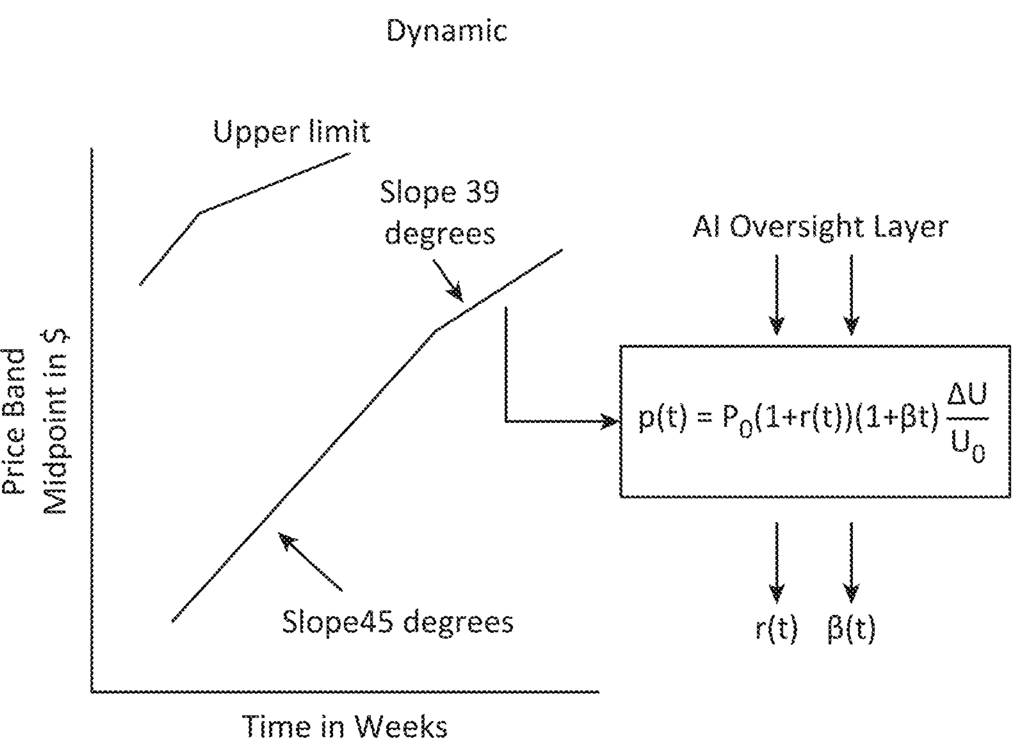
FIG. 2 is a diagram of the adaptive price-band formula illustrating data inputs to coefficients $r(t)$ and $\beta(t)$.

FIG. 2 depicts the variation of the price-band midpoint over time as controlled by the adaptive coefficients. The vertical axis represents the price-band midpoint expressed in fiat-equivalent value, while the horizontal axis represents time. Two linear slope segments are shown—one at approximately 45 degrees and a subsequent segment at 39 degrees—demonstrating how the system automatically assesses then where necessary moderates the rate of appreciation of the hybrid price-band midpoint when equilibrium conditions require slope adjustment to increase or decrease slope. The change in slope (Δθ) corresponds to automatic recalibration of the coefficient r(t) and/or b(t) by the ACC. This diagram exemplifies the adaptive nature of the control algorithm, wherein slope reductions or increases are computed in real-time to maintain transactional balance across fiat and crypto components.

Figure 3:
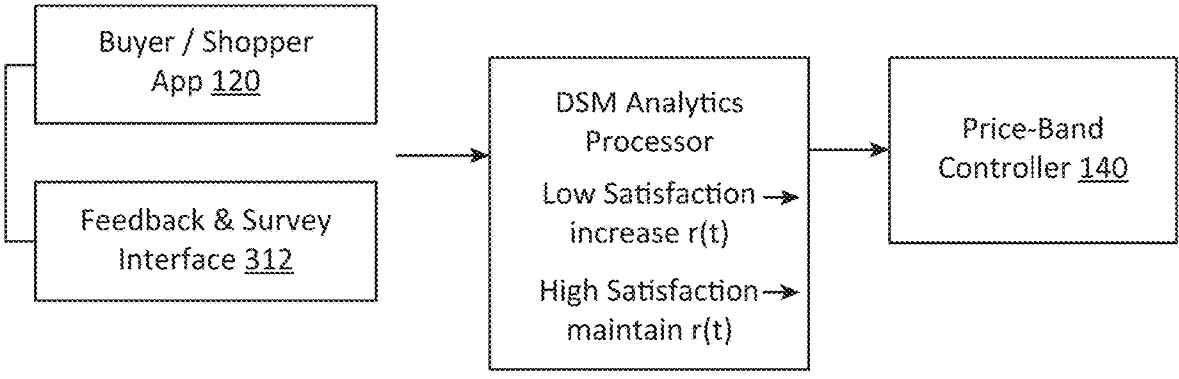
FIG. 3 is a diagram of the Discount-Satisfaction Monitoring subsystem.

FIG. 3 illustrates the Discount-Satisfaction Monitoring (DSM) subsystem responsible for collecting and processing user-experience feedback. A Buyer/Shopper App 120 interfaces with a Feedback and Survey Interface 312 through which post-transaction satisfaction data and coupon-redemption metrics are gathered. These inputs feed into a DSM Analytics Processor, which analyzes satisfaction trends and determines appropriate adjustments to the coefficient r(t) in the adaptive price-band equation. When system analytics detect low satisfaction or redemption inefficiency, the processor instructs an increase in r(t) to improve buyer incentive.

Conversely, when satisfaction levels remain high, r(t) is maintained to prevent excessive token appreciation. The DSM subsystem thereby closes the feedback loop between user sentiment and dynamic pricing control.

Figure 4:
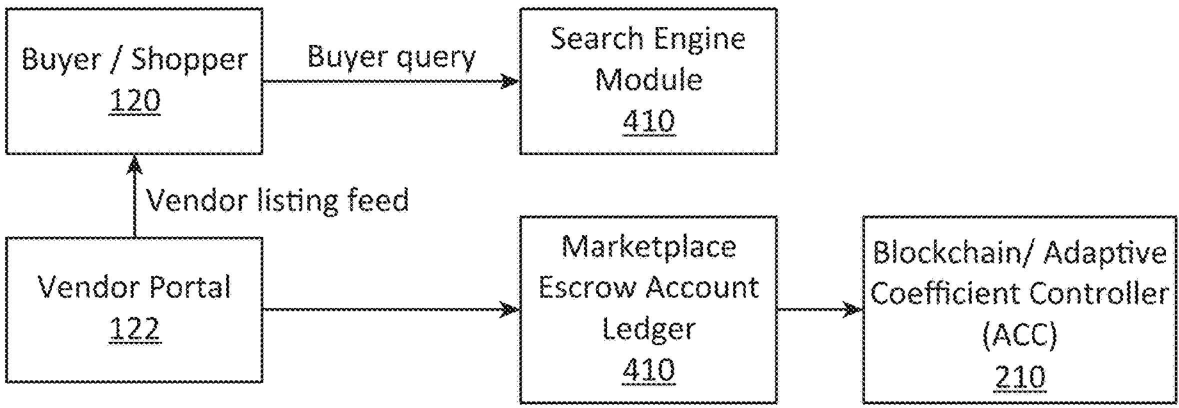
FIG. 4 is a schematic of marketplace escrow and vendor search logic.

FIG. 4 shows the flow of buyer-vendor interactions within the marketplace layer. A Buyer/Shopper 120 initiates a buyer query to a Search Engine Module 410, which locates hybrid offers from participating vendors. Vendor listings are supplied from a Vendor Portal 122, and both buyer queries and vendor listings are reconciled through a Marketplace Escrow Account Ledger 420. The escrow ledger 420 interacts with the Blockchain/Adaptive Coefficient Controller (ACC 210) to determine current coefficient values r(t) and β(t) governing each offer's hybrid valuation.

Offers displayed to users are dynamically adjusted using these coefficients, ensuring price fairness and liquidity stability in real-time.

The integrated marketplace logic thus links escrow functions, vendor listings, and adaptive pricing within a unified blockchain-recorded flow.

Figure 5:
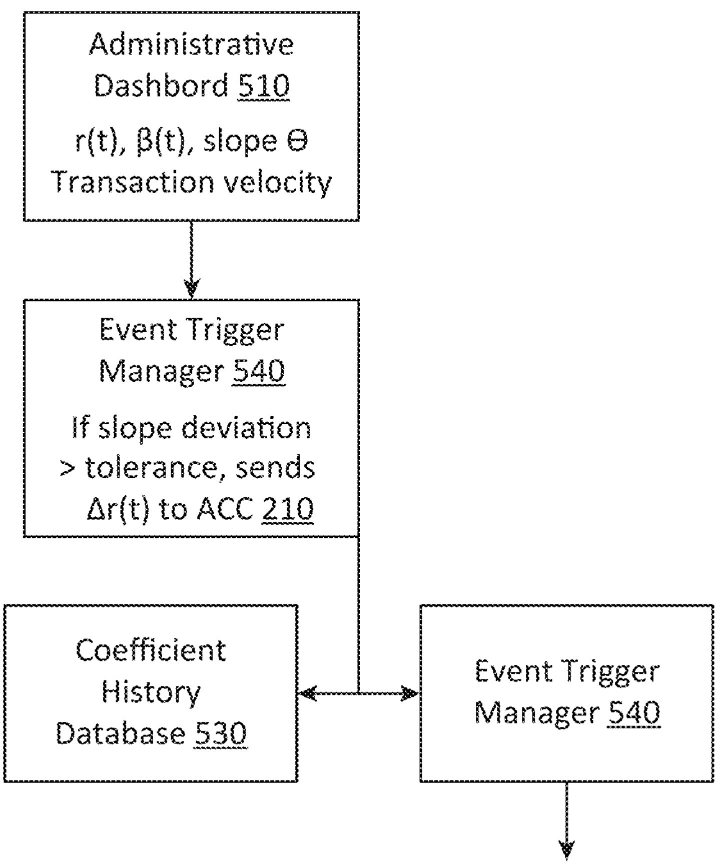
FIG. 5 is a block diagram of the administrative console and AI oversight layer.

FIG. 5 details the AI-enabled administrative oversight functions that supervise slope-monitoring, coefficient correction, and historical feedback. An Administrative Dashboard 510 displays live variables r(t), β(t), slope θ, and transaction velocity. If the monitored slope deviates beyond a predefined tolerance, an Event Trigger Manager 540 issues a corrective delta Δr(t) to the ACC 210.

The Coefficient History Database 530 stores historical coefficient states and exchanges data with the Event Trigger Manager 540 to track trend persistence and tolerance compliance. When slope θ falls below the target threshold, the system automatically corrects r(t) and records Δr and Δθ to the blockchain ledger.

This administrative and AI oversight layer ensures that adaptive corrections remain within governance limits while maintaining full historical traceability.

Figure 6:
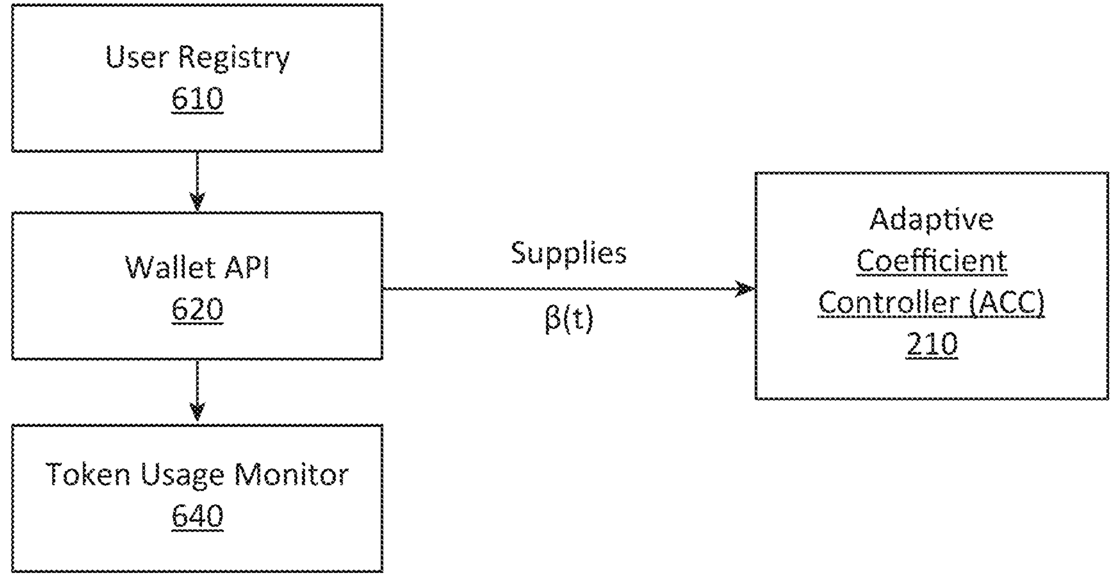
FIG. 6 is a flow diagram of user and vendor onboarding and wallet integration.

FIG. 6 illustrates onboarding processes linking user identity, wallet authentication, and token-usage monitoring to the adaptive control environment. A User Registry 610 authenticates both buyers and vendors and establishes verified system credentials. Following registration, a Wallet API 620 links verified blockchain wallets to the system, enabling secure crypto transactions and supplying the coefficient input (t) to the ACC 210. A Token Usage Monitor 640 tracks ongoing wallet activity, transaction frequency, and participation in hybrid offers. Verified usage patterns increase the weighting of β(t) within the Hybrid Control System, allowing active participants to influence adaptive price-band behavior proportionally to their engagement. This onboarding and wallet-integration flow thus provides a measurable participation metric that ties real-world adoption directly to the system's adaptive coefficient adjustments.

Token Purchase Flow Using Fiat Currency

In various embodiments of the present invention, the system provides a structured, multi-step process by which user-buyers acquire C4D tokens using fiat currency. The token-purchase mechanism is a foundational component of the hybrid fiat-cryptocurrency architecture disclosed herein, because the hybrid transaction flows shown throughout FIGS. 1-9 require user-buyers to possess C4D tokens prior to applying such tokens toward hybrid-offer structures. The following description therefore sets forth an explicit, technologically implemented flow enabling fiat-denominated acquisition of C4D tokens, using the adaptive price-band midpoint P(t).

Token Purchase Flow Overview

The fiat-denominated purchase of C4D tokens proceeds through seven principal stages: (1) user authentication and wallet linkage; (2) fiat initiation; (3) retrieval of the current price-band midpoint P(t); (4) ACC-controlled computation of token quantity; (5) issuance of C4D tokens; (6) blockchain-recordation of issuance and coefficient-state context; and (7) deposit of the purchased tokens into the authenticated user's wallet. These steps collectively ensure that token acquisition is performed in a deterministic, auditable, and price-band-controlled manner.

Step-by-Step Token Purchase Flow

User Authentication and Wallet Linkage

A user-buyer accesses the commerce platform via a user device 110 and authenticates through the User Registry 610 (see FIG. 6). Following successful authentication, the system's Wallet API 620 performs blockchain-wallet linkage, confirming that the user has a verified wallet address capable of receiving C4D tokens.

User Fiat Input and Purchase Request

The authenticated user initiates a token purchase request through a User Interface Module. The user specifies a fiat amount to be converted (e.g., USD, EUR, GBP, JPY), consistent with the multi-fiat operation disclosed in FIG. 8. The system's Fiat Transaction Processor 710 receives this input and prepares the request for conversion in accordance with the active price-band logic.

Optional User-to-User Bid/Accept Marketplace for C4D Token Acquisition

In some embodiments, the system optionally provides a peer-to-peer bid/accept marketplace through which users may buy or sell C4D tokens directly to one another in addition to the primary fiat-denominated purchase method. This optional mechanism does not modify the fundamental price-band-controlled issuance of new tokens, but instead allows users to post token-sell offers or token-buy bids within a system-governed range anchored to the current price-band midpoint P(t). Such user-to-user transactions are subject to automated safeguards ensuring that bid and ask prices remain within an allowable tolerance around P(t), thereby preserving the discount-oriented and non-speculative nature of the ecosystem.

In operation, a token-holding user may post a sell-offer quantity, and another user may submit a corresponding buy bid. When the system detects a match within the permitted band range, the escrow module temporarily holds the buyer's fiat payment (or C4D tokens, in the case of a reverse exchange) while confirming the seller's token balance and authenticity. Upon verification, the system executes a bid/accept transfer, records the transaction to the blockchain ledger along with P(t), r(t), β(t), and any coefficient-context metadata, and transfers the tokens to the buyer's linked wallet. All peer-to-peer token transfers remain fully ledgered, auditable, and bounded to the price-band constraints so that marketplace stability, fairness, and discount coherence are maintained.

This optional user-to-user bid/accept marketplace provides users a secondary mechanism of acquiring or liquidating tokens while upholding the system's consumer-discount orientation and preventing off-band speculation. It further enhances liquidity and user flexibility without altering the primary fiat-to-token issuance pathway described herein.

Retrieval of Current Price-Band Midpoint P(t)

The Adaptive Coefficient Controller (ACC 210) receives the purchase request and retrieves the current price-band midpoint P(t), computed according to the dual-factor control equation:

$$P(t) = P_0 \times [1 + r(t)]^{\alpha} \times [1 + \beta(t)]^{\gamma}.$$

Figure 8:
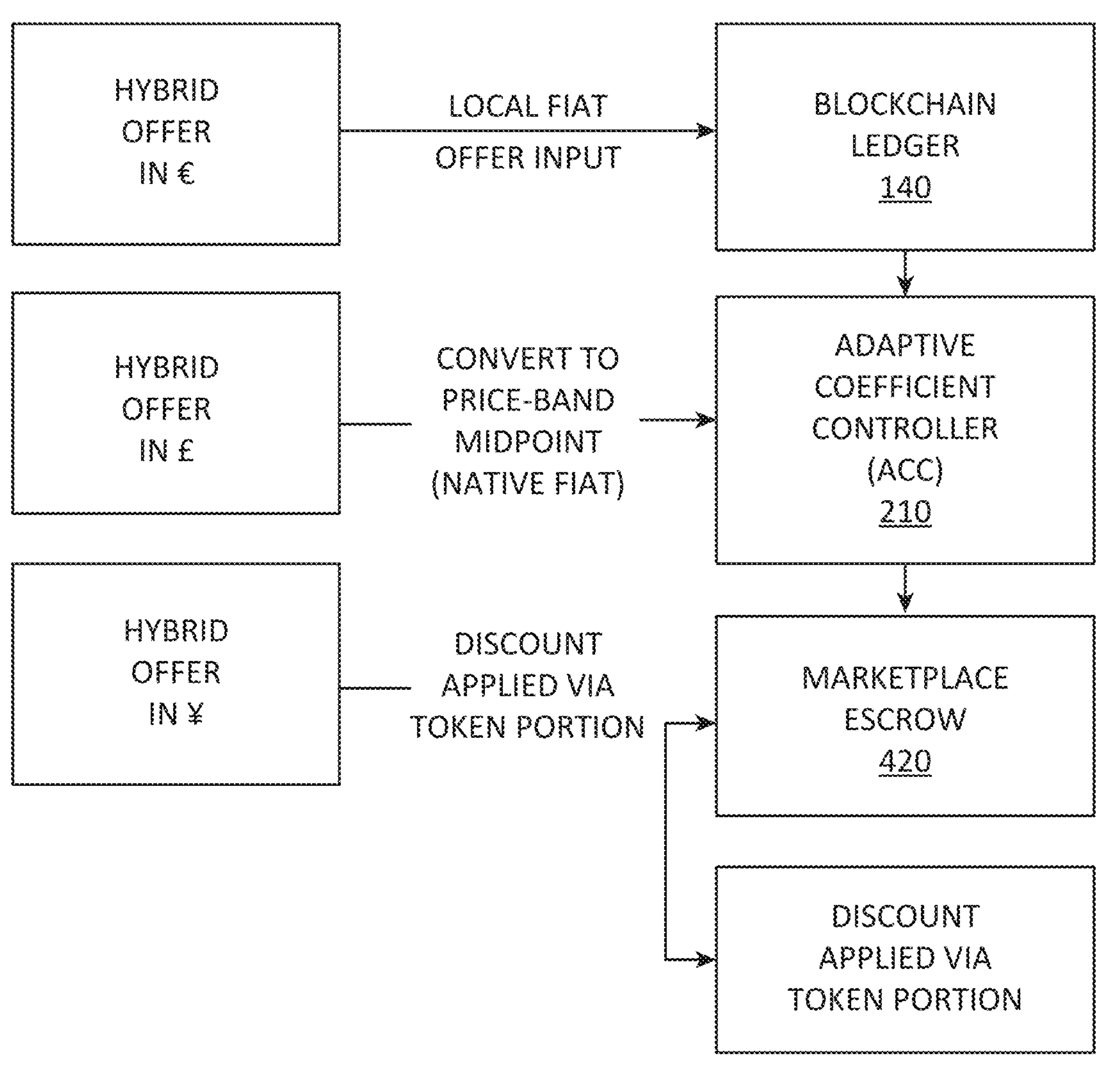
FIG. 8 is a schematic diagram illustrating multi-fiat currency operation within the hybrid price-band control system, showing how vendors in different jurisdictions may present hybrid offers denominated in their local fiat currency (e.g., USD, EUR, GBP, JPY), and how the Adaptive Coefficient Controller (ACC) automatically aligns each such offer to the price-band midpoint expressed in the offer's native fiat units. The diagram highlights the system's capability to operate globally across multiple fiat regimes while maintaining consistent token-based discount logic.

The ACC determines the appropriate fiat-specific representation of P(t) based on the currency selected by the user, as further disclosed in FIG. 8.

ACC-Controlled Conversion of Fiat to Token Quantity

The ACC 210, using the fiat input amount F, computes the number of C4D tokens to be issued by the system according to:

$$\text{Token Quantity} = \frac{F}{P(t)}.$$

This conversion is deterministic, auditable, and linked to the current system state of r(t) and β(t), ensuring that the user's acquisition of tokens aligns with system-wide discount-and-adoption conditions.

Token Issuance

Upon computation of the token quantity, the Token Issuance Engine 720 generates the corresponding number of C4D tokens. In some embodiments, issuance occurs from a controlled reserve or minted supply, subject to system governance and adaptive-coefficient constraints. Issuance is cryptographically signed and validated through the blockchain ledger 140.

Blockchain Ledger Recordation

The system records the issuance transaction to the blockchain ledger 140, including issuance timestamp, token quantity, fiat amount, the applicable value of P(t), and the active states of r(t), β(t), and any adjustment logs Δr or Δβ. This persistent record provides long-term auditability and establishes the historical conditions under which tokens were acquired.

Deposit to User Wallet

After ledger confirmation, the system deposits the generated tokens directly into the authenticated user's linked wallet. The Token Usage Monitor 640 begins tracking such tokens as part of the user's participation profile, enabling later application of the tokens to hybrid offers and enabling potential relative-discount benefits as described in connection with FIG. 7.

Integration with Hybrid-Offer Discounts

Once purchased, the C4D tokens may be held by the user for any desired period. When applied to a hybrid-purchase offer (see FIG. 8), the tokens discharge the crypto portion of the offer using their current fiat-equivalent valuation P(t_later). Because P(t_later) may exceed the earlier P(t purchase) at which the user obtained the tokens, the system provides a "relative discount" consistent with the design principles disclosed in the Additional Embodiment section. This flow is also coherently moderated via FIG. 9 mechanisms to maintain long-term system stability.

Figure 7:
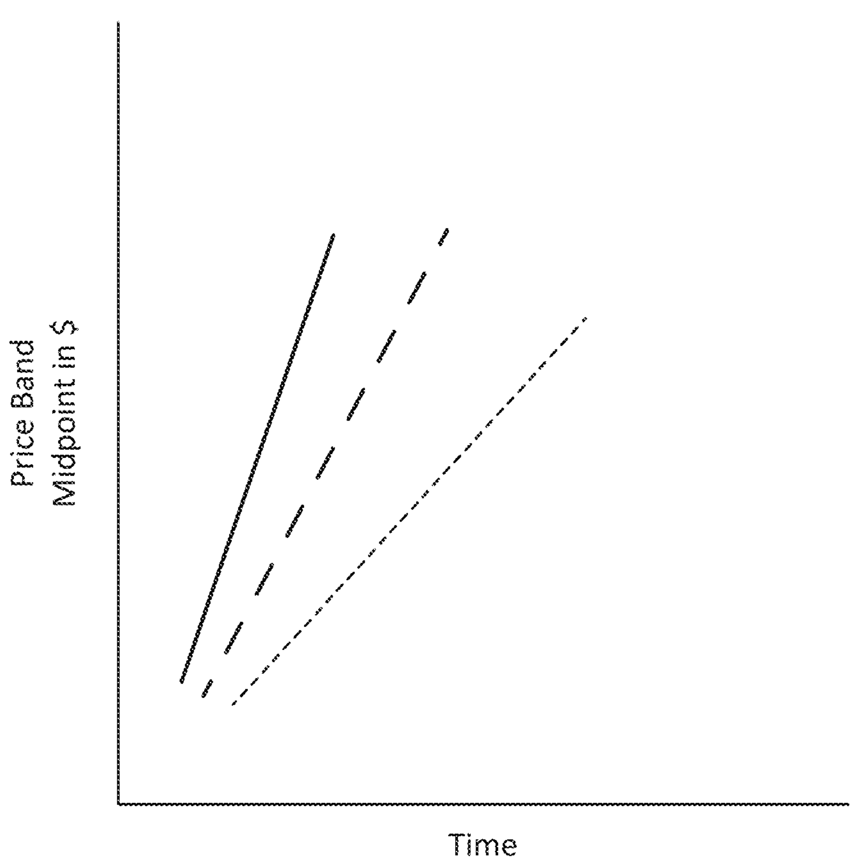
FIG. 7 is a graphical diagram illustrating the relative-discount mechanism achievable under adaptive price-band control, wherein the slope of the price-band rise may exceed the standard 45-degree appreciation case. The graph demonstrates that under accelerated coefficient conditions generated by system response to user petitions or marketplace triggers, the price-band midpoint in fiat-equivalent value may rise more rapidly over time, thereby producing enhanced "relative discounts" for users who hold cryptocurrency tokens prior to redemption within hybrid offers.

FIG. 7 depicts a family of possible price-band trajectories plotted as a function of time (horizontal axis) against the hybrid price-band midpoint expressed in fiat-equivalent value (vertical axis).

The 45-degree line (small dash) represents the baseline appreciation scenario governed by nominal coefficient values r(t) and β(t), which correspond respectively to transactional satisfaction and marketplace adoption rates. In this nominal case, appreciation of the hybrid token value proceeds in balanced proportion to user growth and vendor participation.

It should be understood that the accelerated-rise trajectories (large dash and solid line) illustrated in FIG. 7 may be initiated not only through user-supplied feedback or requests, but also through system-triggered or administrator-authorized adjustments. In particular, the Adaptive Coefficient Controller (ACC 210) and the Administrative AI Oversight Layer 200 may autonomously determine, based on monitored transactional, satisfaction, or supply-chain conditions, that at least one of the coefficients r(t) or β(t) should be increased to generate a slope greater than the nominal 45-degree trajectory. Thus, accelerated appreciation of the price band may occur automatically or through administrative intervention, and is not limited to user-petition scenarios.

Adjacent, steeper lines illustrate accelerated-rise conditions wherein the Adaptive Coefficient Controller (ACC 210) and Administrative AI Oversight Layer 200 jointly authorize an increase in one or both coefficients. Such acceleration may occur in response to verified petitions or collective voting from buyer-users seeking higher potential "relative discounts." Although FIG. 7 describes accelerated-rise conditions that may occur in response to verified user petitions, such acceleration is not limited to petition-based events. In various embodiments, accelerated increases in one or both coefficients r(t) or β(t) may also be triggered by administrator-directed adjustments or automatically by the system itself based on monitored transactional conditions, redemption efficiency, supply-chain participation, or other marketplace metrics. Thus, the initiation of accelerated price-band appreciation encompasses user-originated requests, administrative determinations, and autonomous system responses, collectively or individually. Upon approval, the system increases r(t) and/or β(t) within the dual-factor equation $$P(t)=P_0\times[1+r(t)]^{\alpha}\times[1+\beta(t)]^{\gamma},$$

resulting in a slope greater than 45 degrees. The steeper slope signifies that tokens purchased earlier in time reach a higher band midpoint sooner than in the baseline case, yielding a compounded relative discount when those previously acquired tokens are later applied to hybrid-purchase offers.

This dynamic allows the system to reward early participation without destabilizing the overall hybrid economy, because all slope changes remain governed by AI-controlled tolerance limits and blockchain-recorded coefficient deltas (Δr, Δβ, Δθ). Accordingly, FIG. 7 discloses the novel benefit whereby user-initiated petitions can legitimately and transparently accelerate appreciation within the adaptive-price-band environment, granting qualified users increased purchasing advantage—termed "relative discount potential"—while preserving equilibrium across fiat and crypto components of the system.

FIG. 8 depicts multiple vendor terminals 120A, 120B, and 120C located in different geographic or economic regions, each presenting a hybrid purchase offer denominated in its respective local fiat currency. By way of example, vendor terminal 120A displays a hybrid offer priced in U.S. dollars (USD), vendor terminal 120B displays a hybrid offer priced in euros (EUR), and vendor terminal 120C displays a hybrid offer priced in British pounds (GBP). In other embodiments, hybrid offers may be denominated in other globally recognized fiat currencies including Japanese yen (JPY), Canadian dollars (CAD), or Australian dollars (AUD).

Each vendor terminal communicates its fiat-denominated price components to the Blockchain Ledger 140 and to the Adaptive Coefficient Controller (ACC 210) within the administrative oversight layer 200. The ACC 210 computes the applicable price-band midpoint P(t) for each hybrid offer in its native fiat units using the dual-factor control equation:

$$P(t)=P_0\times[1+r(t)]^{\alpha}\times[1+\beta(t)]^{\gamma}.$$

Because the coefficients r(t) and β(t) are dimensionless and universally applied, this equation operates identically across different fiat regimes without requiring structural modification. Thus, the dollar-denominated offer at terminal 120A is aligned to a dollar-denominated P(t), while the euro-denominated offer at terminal 120B is simultaneously aligned to a euro-denominated P(t), and so on.

As illustrated in FIG. 8, each hybrid offer is routed through Marketplace Escrow 420 and processed according to the fiat-specific price-band midpoint calculated by the ACC 210. The system thereby determines the correct cryptocurrency portion of the offer based on the local fiat-equivalent valuation of the price band. This allows vendors in different jurisdictions to present hybrid offers naturally in their native fiat currency while ensuring consistent application of discount logic across all markets.

Accordingly, FIG. 8 demonstrates the invention's inherent capability for multi-fiat operation, enabling global deployment of the hybrid discount system. By normalizing each hybrid offer to a fiat-specific price-band midpoint, the invention maintains coherence, stability, and predictable user-discount outcomes across diverse monetary environments.

Relative Discount Scenario for Hybrid Purchase of an Automobile

Figure 12:
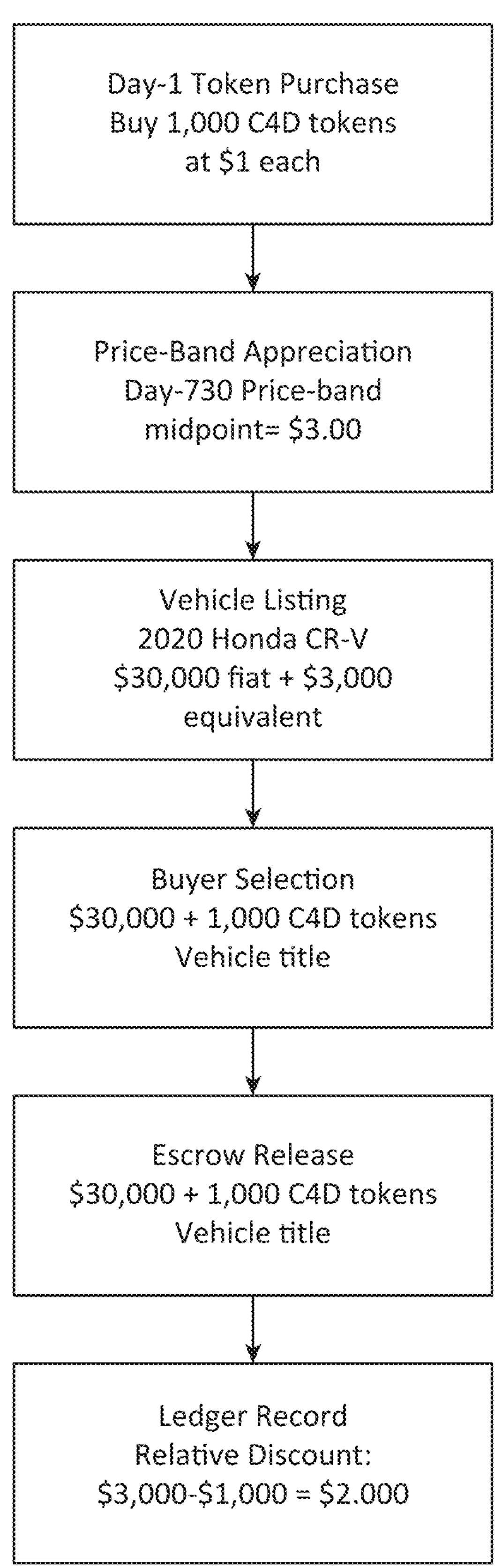
FIG. 12 is a hybrid-transaction flow diagram illustrating a relative-discount automobile purchase wherein a user-buyer who previously acquired C4D tokens at a Day-1 price-band midpoint of $1.00 applies those tokens at a later Day-730 price-band midpoint of $3.00 toward a seller's hybrid vehicle offer comprising a $30,000 fiat payment and $3,000 equivalent in C4D tokens.

In an embodiment of the invention, the adaptive price-band architecture of the C4D system enables a measurable "relative discount" for a user-buyer who acquired C4D tokens earlier in time at a lower fiat cost, and who later applies such tokens to a hybrid offer for a higher-value good. FIG. 12 illustrates an exemplary transaction path wherein a buyer purchases a vehicle using both fiat currency and C4D tokens whose fiat-equivalent valuation has increased pursuant to the system-controlled price-band midpoint.

Day-1 Token Acquisition

On Day 1 of the scenario, a user-buyer registers through the User Registry 610 and links a wallet with Wallet API 620. The buyer then purchases 1,000 C4D tokens via the fiat-to-token process described in FIGS. 10 and 11. At Day-1 price-band midpoint P(1)=$1.00, the buyer pays $1,000 fiat to acquire the 1,000 C4D tokens, which are deposited into the buyer's blockchain wallet.

Price-Band Appreciation by Day 730

Through dual-coefficient adaptive control (r(t), β(t)), the system's price-band midpoint adjusts over time in response to adoption, redemption performance, and marketplace-satisfaction variables. At Day 730, the active midpoint is P(730)=$3.00 per token. Accordingly, the buyer's 1,000 held tokens now represent $3,000 in fiat-equivalent value for use in a hybrid offer. This appreciation does not constitute an investment yield; rather, it is a system-programmed relative discount that rewards participation and early token acquisition.

Vehicle Listing and Seller Hybrid Offer

On Day 730, a user-seller lists a 2020 Honda CR-V on the C4D platform. The ad displays:

Standard Price: $36,000

Hybrid Discount Offer: $30,000 fiat+C4D-token equivalent of $3,000

The seller configures this hybrid offer using the Vendor Offer Composer, which retrieves P(730) and computes the required C4D amount for the crypto portion:

$$\$3{,}000/P(730) = 3{,}000 = 1{,}000\,C4D \text{ tokens.}$$

Hybrid Transaction Execution via Escrow

The user-buyer elects to purchase the vehicle on Day 730 and initiates a hybrid-payment authorization. The system's Escrow Module receives:

$30,000 fiat from the buyer 1,000 C4D tokens from the buyer's linked wallet

The escrow module holds the fiat and tokens while prompting the user-seller to deposit title to the vehicle into the escrow. Once the seller's title document is verified, the escrow module performs simultaneous release:

Fiat $30,000+1,000 C4D tokens are transferred to the seller's designated wallet and bank link;

The verified title is transmitted to the user-buyer.

The blockchain ledger records both the C4D-token transfer and the title-exchange metadata to ensure an immutable audit trail.

Resulting Relative Discount

Because the user-buyer acquired the 1,000 C4D tokens on Day 1 at $1,000 total fiat cost, but used them on Day 730 as $3,000 fiat-equivalent value, the buyer experiences a $2,000 relative discount embedded within the hybrid offer. The seller suffers no loss because the C4D tokens applied by the buyer are valued by the system at the Day-730 midpoint, consistent with system-governed valuation.

This embodiment demonstrates how the C4D architecture programmatically aligns early participation with later purchasing power without treating token holding as an investment vehicle; rather, the appreciation of P(t) produces a built-in relative discount at the point of hybrid purchase.

Figure 9:
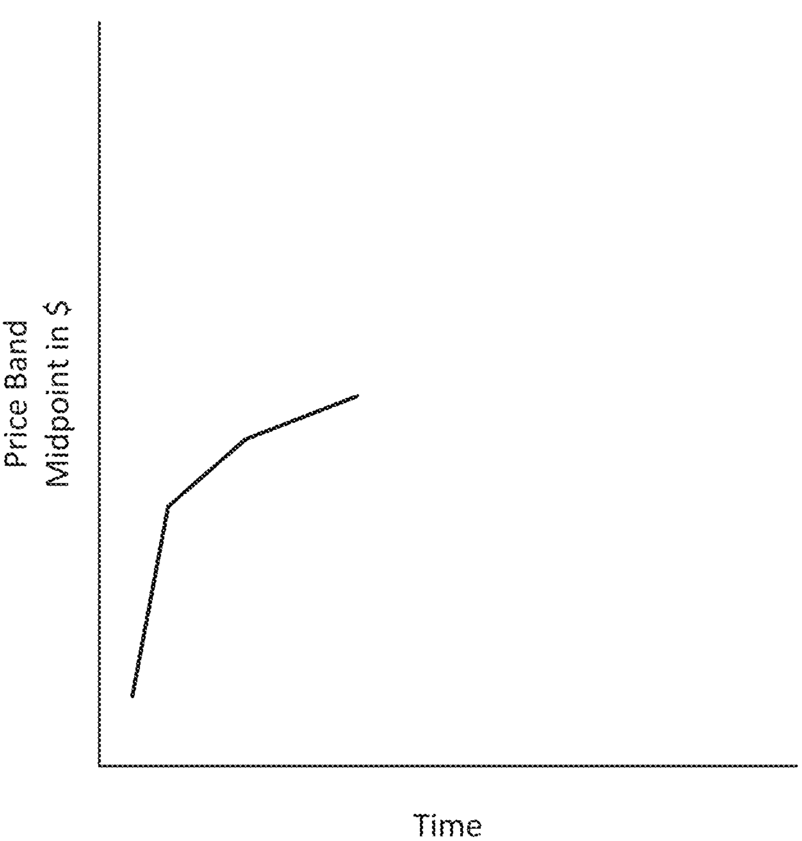
FIG. 9 is a graphical diagram illustrating multi-slope moderation of the hybrid price-band midpoint, showing how the system detects growth-rate conditions that would otherwise cause excessive token appreciation or transactional imbalance, and automatically adjusts issuance rates and slope angles to maintain long-term ecosystem cohesion.

FIG. 9 illustrates a moderated, multi-segment trajectory of the hybrid price-band midpoint plotted over time. The vertical axis represents the price-band midpoint expressed in fiat-equivalent value, and the horizontal axis represents time. Unlike the accelerated-rise embodiments of FIG. 7, which depict beneficial slope increases used to produce relative discount potential, FIG. 9 addresses the opposite condition-namely, the need to prevent destabilizing over-appreciation of cryptocurrency value in systems where transaction volume or user growth increases at a slower rate than the token-appreciation trend.

In hybrid fiat-cryptocurrency commerce systems, a functional imbalance may occur if the adaptive price band rises too rapidly relative to the transactional growth of the ecosystem. As the fiat-equivalent value of the token increases, a smaller number of tokens is required to satisfy the crypto portion of a fixed-price hybrid transaction. For example, if a hybrid offer requires the crypto equivalent of ten dollars, and the token's fiat-equivalent value doubles, only half as many tokens are required. If appreciation continues without supply correction, the quantity of tokens required for everyday transactions becomes vanishingly small. This effect means that users who purchased tokens early may hold enough tokens to supply the entirety of expected demand for a slowly growing marketplace. Without corrective measures, such an imbalance reduces ongoing token circulation, discourages vendor participation, and undermines the intended hybrid economic design.

To avoid this cohesion-loss scenario, the invention includes adaptive monitoring of system growth rates, token-circulation velocity, redemption frequency, and supply-chain adoption metrics. The Adaptive Coefficient Controller (ACC 210), in combination with the Administrative AI Oversight Layer 200, evaluates whether the effective appreciation of the token is outpacing real transactional expansion. When the system detects that growth is slower than projected, or that tokens are accumulating without corresponding marketplace throughput, the ACC applies moderated-slope adjustments—shown in FIG. 9 as sequential, shallower slope segments.

These moderated slopes represent dynamic reductions in one or both coefficients r(t) and β(t), or a programmed increase in issuance where appropriate, thereby preventing the hybrid price band from rising at a rate that would cause long-term oversupply of token liquidity relative to transaction demand. In various embodiments, the ACC may:

(a) reduce r(t) to limit appreciation driven by user-sentiment inputs;

(b) reduce β(t) to limit appreciation driven by supply-chain or adoption metrics;

(c) programmatically increase issuance of tokens in controlled amounts;

(d) apply combinations of the above actions according to governance rules.

Accordingly, FIG. 9 demonstrates the system's ability to maintain equilibrium by tempering price-band rise in conditions where unchecked appreciation would lead to transactional inefficiency, diminished velocity, or disproportionate advantage accruing to early token purchasers. The multi-slope correction shown in FIG. 9 ensures that token value increases remain harmonized with real marketplace growth, preserving stability, fairness, and long-term viability of the hybrid commerce ecosystem.

Figure 10:
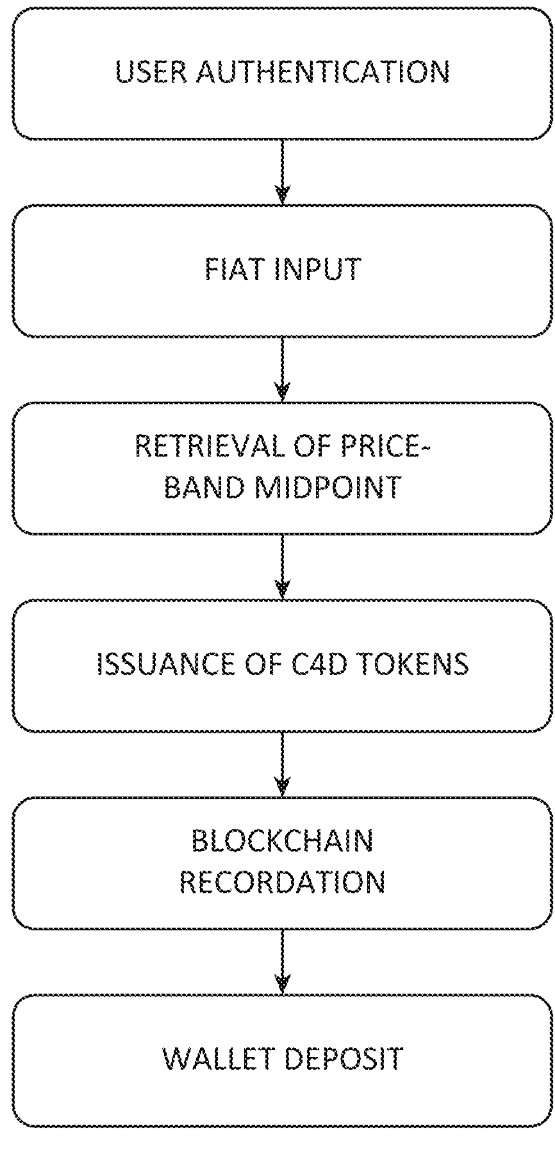
FIG. 10 is a simplified block diagram illustrating the core steps of fiat-denominated C4D token acquisition, including user authentication, fiat input, retrieval of the price-band midpoint, issuance of C4D tokens, blockchain recordation, and wallet deposit.

FIG. 10 depicts user device 110 initiating a token purchase request through a Purchase Request Block X10. A Fiat Input Block X20 receives a user-specified fiat amount. The request passes to a Price-Band Retrieval Block X30, which obtains the current P(t) value from the Adaptive Coefficient Controller (ACC 210). A Conversion and Issuance Block X40 computes token quantity F÷P(t) and issues the corresponding C4D tokens. Next, a Blockchain Ledger Entry Block X50 records the transaction to ledger 140. Finally, a Wallet Deposit Block X60 transfers the issued tokens into the authenticated user's wallet linked via the Wallet API 620. Arrows indicate sequential data flow between each block.

Figure 11:
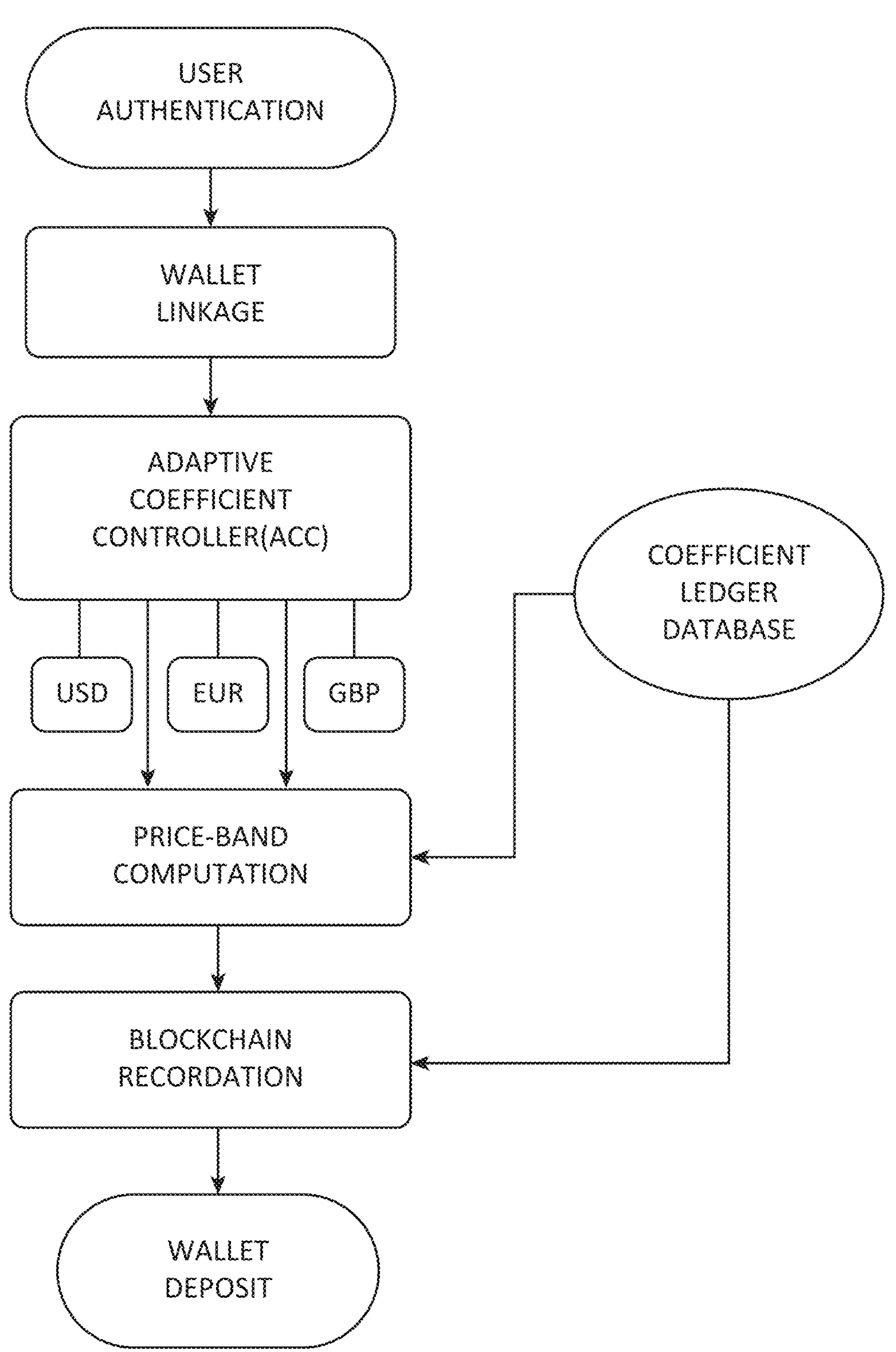
FIG. 11 is a system-level diagram illustrating an advanced, multi-module implementation of fiat-to-token conversion, including user authentication, wallet linkage, fiat processing, Adaptive Coefficient Controller functions, price-band computation, token issuance, blockchain recordation, and integration with multi-fiat currency logic.

FIG. 11 includes user device 110 communicating with User Registry 610 and Wallet API 620. A Fiat Transaction Processor 710 receives the fiat purchase request and communicates with the Adaptive Coefficient Controller (ACC 210). The ACC accesses the Coefficient Ledger Database 530 to retrieve r(t), β(t), $P_0$, α, and γ values and computes P(t) in the user's fiat currency. A Token Issuance Engine 720 calculates and issues the appropriate number of C4D tokens. Issuance and coefficient context are sent to the Blockchain Ledger 140 for recording. Multi-fiat nodes X90 (USD, EUR, GBP, JPY, etc.) illustrate conversion alignment. An optional Administrative Console 510 displays live variables and audits issuance. Finally, a Wallet Deposit Block 730 transfers the issued tokens into the user's linked wallet. Arrows show bi-directional or uni-directional data exchange consistent with system operation.

FIG. 12 depicts a timeline and transaction flow for the relative-discount scenario. A Day-1 Token Purchase Block 1210 shows the buyer obtaining 1,000 C4D tokens at $1 each using fiat via the token-purchase flow of FIGS. 10 and 11. A Price-Band Appreciation Block 1220 indicates that by Day 730, the system-controlled price-band midpoint P(730) equals $3.00, increasing the fiat-equivalent value of the buyer's 1,000 tokens to $3,000.

A Vehicle Listing Block 1230 shows the seller's online advertisement offering the 2020 Honda CR-V at a hybrid price of $30,000 fiat+$3,000 equivalent in C4D tokens. A Buyer-Selection Block 1240 shows the buyer agreeing to the offer. An Escrow Intake Block 1250 receives from the buyer (i) $30,000 fiat and (ii) 1,000 C4D tokens, and further receives the seller's vehicle title.

An Escrow Release Block 1260 simultaneously transfers the $30,000 and 1,000 tokens to the seller while transmitting the title to the buyer. A Ledger Record Block 1270 records the transaction details, including token quantity, price-band midpoint, and title-transfer metadata, to the blockchain ledger. A Relative-Discount Output Block 1280 indicates the buyer's realized discount, corresponding to the difference between the original Day-1 token acquisition cost ($1,000) and the Day-730 hybrid-offer application value ($3,000).

Additional Embodiment—Relative Discount on Held Tokens

It is understood that user-buyers can purchase C4D coins and hold these coins for a period of time. After such holding period, it is understood—by virtue of the P formula for dual-factor increase of the price band—that user-buyers applying such held-for-time C4D coins to a current hybrid offer will receive a direct discount within the offer and a likely second "relative" discount. This second relative discount occurs because the value of these held-for-time C4D coins, when applied for example to the advertisement of FIG. 8 involving the purchase of a Honda CR-V, fills the crypto portion of the offer (e.g., $3,000 fiat equivalence) with C4D coins that were originally purchased by the user-buyer for a significantly lesser fiat amount than $3,000. The magnitude of such relative discount achievable within the instant invention system is related to the price-band rise over time, as controlled via factors of the P equation. In a preferred embodiment, user-buyers can petition the administration of the C4D site to increase the "relative" discount potential by accelerating the factors leading to such relative discount.

Price-Band Dual-Factor Control Equation (P Formula):

In preferred embodiments, the system computes the price-band midpoint and range according to the dual-factor adaptive equation:

$$P(t) = P_0 \times [1 + r(t)]^{\alpha} \times [1 + \beta(t)]^{\gamma}$$

where:

P(t) is the dynamic hybrid price-band midpoint at time t;

$P_0$ is the initial baseline valuation set at issuance;

r(t) represents the appreciation-rate coefficient reflecting transactional satisfaction and coupon redemption behavior;

β(t) represents the supply-chain and adoption coefficient reflecting vendor participation and system liquidity;

α and γ are weighting exponents determined by administrative AI oversight to maintain slope equilibrium;

and adjustments are recorded to a Coefficient Ledger Database to ensure traceable, blockchain-verifiable audit of each P(t) change.

The "dual-factor increase" referenced throughout the specification corresponds to the simultaneous positive modulation of r(t) and (t), which raises P(t) within the controlled band to reward marketplace balance and long-term participation.

The accelerated-slope embodiments described in connection with FIG. 7 operate solely within a consumer-pricing framework and serve to increase available discount value rather than to create any investment-type opportunity. Accordingly, the following section clarifies that the system, in all embodiments, is designed and governed as a discount-oriented, non-investment environment. The system architecture precludes speculative use by limiting token application exclusively to transaction-based hybrid payments.

Discount-Not-Investment Environment

In preferred embodiments of the present invention, the system is expressly configured to operate within a consumer-discount environment rather than an investment environment. The adaptive price-band features, including the accelerated-slope embodiments illustrated in FIG. 7, are intended to enhance the discount value available to users when applying previously acquired C4D tokens toward hybrid-purchase offers. The system therefore enables users to obtain more favorable pricing on goods or services, based on the relative increase in the price-band midpoint, rather than to obtain any investment-type gain or profit from holding cryptocurrency.

The accelerated appreciation of the price band, whether under nominal conditions (e.g., a 45-degree trajectory) or under administrator-authorized or system-authorized enhanced trajectories, is implemented solely to increase the discount magnitude available within hybrid payment transactions. In all embodiments, the C4D tokens are used as consumer utility instruments, functioning as a discount-enabling component of the hybrid price rather than as an instrument of investment or speculation. No dividends, equity rights, profit-sharing rights, or appreciation-claim rights are conferred by the possession of C4D tokens. All appreciation in the price-band midpoint is applied exclusively as a discount mechanism within the hybrid-offer structure.

Thus, although FIG. 7 illustrates that the system can generate price-band slopes greater than the nominal case, such accelerated rise does not operate as, nor is it intended to resemble, an investment return. Instead, the accelerated slope allows a user who previously purchased C4D tokens at an earlier fiat cost to apply those tokens within an offer at a later point where the system-defined fiat-equivalence is higher, resulting in a greater transactional discount. This "relative discount" is therefore a purchase-price reduction embedded in a consumer-facing commerce system and is not a capital gain, yield, or appreciation benefit in the investment sense. At no point does the system present expected-return projections, profit forecasts, or appreciation inducements.

Throughout the specification, the term "relative discount" should be understood as a consumer benefit arising from the controlled rise of the hybrid price band, and not as an investment gain or return. The invention, in all embodiments, maintains the objective of enlarging price reductions for users within a regulated, non-investment, discount-focused commerce environment.

In some embodiments, the C4D ecosystem may optionally be configured or understood as a "Discount Club" structure. In such embodiments, C4D tokens function similarly to membership discount credits or loyalty-program units, enabling user-buyers to access seller-defined hybrid discount offers. This framing does not limit the invention but provides an optional interpretation in which token acquisition and use are viewed as mechanisms for obtaining commercial discounts, rather than as an investment activity. The adaptive price-band maintains predictable valuation so that buyers and sellers may interact within a stable, discount-oriented commerce environment without reliance on speculative token markets.

Long-Term Token Valuation And System Stability

Because the C4D system is capable of global deployment and multi-decade operation, the price-band midpoint P(t) may progressively increase as adoption grows. In such a future scenario, the fiat-equivalent value of a single C4D token may exceed the price of common low-cost goods or services. Although fractional-token transfers can support such transactions, the use of very small decimal quantities may become impractical or undesirable for system participants.

Therefore, in some embodiments, the system optionally incorporates one or more stability provisions to ensure long-term usability and smooth microtransaction performance. These optional provisions may include (i) increased decimal-precision support for fractional token payments; (ii) moderated or flattened appreciation slopes when P(t) approaches a high-value stability region; (iii) automatic adjustment of r(t) and β(t) coefficients to maintain circulation velocity and user experience; or (iv) optional user-interface display of fractional tokens as higher-order sub-units for clarity.

Such optional stability features do not modify the fundamental discount-oriented nature of the system, but provide future scalability and user convenience as C4D adoption expands worldwide.

Optional Embodiments for System Reset and Transaction-Flow Restoration

In further optional embodiments, the C4D system may include one or more system-reset or transaction-restoration mechanisms configured to address rare circumstances in which transactional activity materially slows or temporarily stalls. Such conditions may arise, for example, when prolonged appreciation in the price-band midpoint P(t) produces user reluctance to transact in extremely small fractional quantities of C4D tokens, or when hybrid-offer density decreases due to macro-economic or supply-chain fluctuations. The following reset mechanisms do not alter the foundational price-band architecture of the invention, but provide optional administrative or algorithmic interventions to sustain system usability and consumer access to hybrid discount benefits.

1. Soft Recalibration of the Active Price Band

In one optional embodiment, the Administrative Console may initiate a soft recalibration of the active price band by temporarily adjusting the rate coefficient r(t), the moderation coefficient β(t), or both. Such recalibration may reduce the upward drift of the price-band midpoint P(t), narrow the permissible band width, or temporarily stabilize the price band during periods of reduced transaction velocity. All recalibration events are recorded to the blockchain ledger to ensure transparency, auditability, and continuity of valuation history. Soft recalibration does not constitute a reversal of prior band evolution; rather, it functions as a gentle corrective mechanism to restore transactional equilibrium while preserving the long-term discount orientation of the system.

2. Stability-Region Mode (Temporary Band Freeze)

In another optional embodiment, the system may transition into a Stability-Region Mode wherein updates to the price-band midpoint P(t) are temporarily paused. While in this state, the system maintains the existing price-band range and suppresses upward movements of P(t) until transactional activity returns to acceptable levels. The freeze state may be triggered automatically based on metrics of transaction velocity, hybrid-offer density, token-circulation age distribution, or other adoption indicators, or may be initiated manually by authorized administrators. Upon exit from Stability-Region Mode, r(t) and β(t) resume normal controlled updates. This mode prevents further price-band escalation during periods of suppressed user activity while maintaining the system's discount-driven foundational logic.

3. Temporary Local Valuation Bands ("Holiday Bands")

In a further optional embodiment, the system may authorize Temporary Local Bands—also referred to as Holiday Bands—that permit user-buyer and user-seller pairs to complete specific transactions at a mutually agreed valuation band lower than the globally governed price-band midpoint P(t). The Temporary Local Band applies only to the consenting pair for the duration of the specific transaction and does not influence global band evolution. During such a transaction, the system records both (i) the global price-band parameters and (ii) the mutually agreed local valuation parameters to the blockchain ledger. This mechanism enables continued transactional flow at times when P(t) is temporarily elevated in a way that users perceive as inconvenient for small-value commerce.

4. System-Sponsored Hybrid Liquidity Injection

In another optional embodiment, the system may deploy system-sponsored hybrid transactions or incentives configured to stimulate transactional flow. These may take the form of system-created offers, discount multipliers, or limited-time incentives designed to encourage user participation during periods of reduced activity. Such system-sponsored interactions reintroduce marketplace momentum without affecting the long-term evolution of P(t) or the price-band coefficients.

5. Vendor-Incentive Modifiers

In further embodiments, the Administrative Console may temporarily activate vendor-incentive modifiers, such as reduced marketplace fees, increased allowable discount margins, or "featured placement" of hybrid offers. These modifiers encourage vendors to re-engage with the hybrid-offer creation tools during periods of transactional slowdown. Because vendors supply much of the system's discount topology, stimulating seller participation naturally revitalizes buyer-side activity.

6. Decimal-Redenomination Display (User Interface Only)

In some embodiments, the system may optionally present fractional C4D quantities under a decimal-redenomination scheme, such as "mC4D" (micro-C4D), improving user clarity when small-value payments require the transfer of minute decimal quantities. This redenomination occurs solely at the user-interface level and does not alter the fundamental token unit, the blockchain ledger, or the underlying price-band governance. Such interface-level adjustments enhance usability without modifying economic behavior.

7. Controlled Band-Region Reversion (Rare, Transparent Hard Reset)

In an exceptional embodiment, the system may perform a controlled reversion to a prior band region. This mechanism is reserved for scenarios where the price-band structure has evolved to a level incompatible with stable commercial use and other corrective mechanisms have proven insufficient. A controlled reversion is executed with full transparency, requires multi-signature administrative authorization, and permanently records the rationale, parameters, and resulting update to the blockchain ledger. Historical ledger data is not erased; instead, the reversion establishes a new active band region while preserving continuity of record.

8. Transaction-Velocity Adaptive Adjustments

In an additional embodiment, the system may autonomously monitor indicators of transactional health-including transaction velocity, median token-holding duration, hybrid-offer publication frequency, and circulation density- and may automatically adjust r(t), β(t), or related control variables to restore typical user activity. Such adjustments operate within the same governance constraints applied to ordinary coefficient updates and are recorded to the ledger as part of the system's ongoing adaptive control process.

9. Communication-Based Reset Measures

In still another optional embodiment, the Administrative Console may issue global system notifications, including educational materials, explanations of temporary measures, or scheduled reset interventions. These communications do not alter price-band parameters directly but materially improve user comprehension and confidence during periods of transactional slowdown. Increased transparency often accelerates natural re-engagement with hybrid-offer and token transactions, thereby restoring system equilibrium.

Summary of Reset Mechanisms

Collectively, these optional reset mechanisms provide the C4D ecosystem with a flexible toolkit for maintaining transaction continuity during periods of transient disruption or unusually high price-band valuations. Each mechanism is designed to preserve the system's consumer-oriented discount structure, avoid any investment-like characterization, and maintain long-term usability and stability across a global, multi-decade operational timescale. None of these embodiments is required for the core invention, and each may be deployed independently or in combination depending on observed system conditions.

C4D vs. Bitcoin (51% Attack Distinction)

In some embodiments, the structural integrity of the C4D platform is distinguished from decentralized proof-of-work blockchain systems such as Bitcoin. In a proof-of-work architecture, network consensus may be theoretically compromised by a so-called "51% attack," wherein an entity controlling a majority of total mining power may rewrite transaction history, impose invalid blocks, or disrupt ledger finality. Such vulnerabilities arise from reliance on open, permissionless mining for consensus formation.

By contrast, the C4D system does not depend on competitive mining or majority-hash-power consensus. The security and predictability of C4D transactions derive instead from the system's programmatic price-band enforcement, which defines the permissible valuation window in which C4D tokens may be applied during hybrid or full-token transactions. Because token usability is constrained by these deterministic valuation parameters—implemented through administrative or algorithmic control of the coefficients governing P(t), r(t), and β(t)—transactional integrity does not depend on miner dominance, chain reorganization resistance, or probabilistic settlement.

As a result, the C4D architecture is not susceptible to a computational majority-attack model. The correctness of permitted transaction valuations arises from centralized or semi-centralized price-band governance rather than from miner consensus, and no entity can gain transactional advantage by amassing processing power. The C4D platform's stability is anchored in valuation rules, escrow verification, and price-band compliance, which collectively ensure that transactions cannot be fraudulently repriced or reversed by external hash-power manipulation. This C4D architecture yields a distinct security posture compared to Bitcoin, emphasizing predictable discount functionality, regulated commerce alignment, and transactional assurance rather than reliance on open-network mining consensus.

Non-Investment Clarification

In additional embodiments, the distinction between the C4D system and an investment program is made explicit through the controlled nature of the C4D price band and the absence of any guarantee of transactional outcomes. The system's programmed rise or moderation of the price-band midpoint P(t), as governed by the dual-coefficient controller (r(t), β(t)), reflects only the internal operation of the C4D platform's valuation architecture. The price band constitutes a window of permissible transactional valuations, but does not in itself create, imply, or guarantee that any C4D token will be transacted at any specific time or at any specific value.

Each transaction involving C4D tokens requires the independent presence of a willing buyer and a willing seller, such as a user-buyer who chooses to apply C4D tokens and a user-seller (e.g., a vendor) who elects to offer a hybrid deal incorporating both fiat currency and C4D token amounts. The C4D system does not guarantee that such complementary participants will appear for any given offer, nor does it ensure that any particular token holder will succeed in identifying a transactional counterpart. The platform merely provides the venue and technical infrastructure for parties to meet, evaluate hybrid offers, and conduct escrow-secured transfers using tokens recorded on the linked blockchain.

The system's programming guarantees only that (i) the price band will be updated in accordance with adoption parameters, transactional feedback, and the system's coefficient logic, and (ii) users will be informed of the current price-band state at the time of potential transaction. The system does not guarantee that the use of C4D tokens in any particular transaction will generate profit, savings, or any minimum economic outcome. A user-buyer may, through individual decision-making, identify a hybrid offer that yields a favorable exchange (e.g., purchasing a vehicle on advantageous terms), but such outcomes are the result of buyer discretion, not system promise. Similarly, a user-seller may compose a hybrid offer that yields a desirable commercial result if accepted by a buyer, but such result is the seller's responsibility and not assured by the system.

Thus, the C4D platform supports a commerce-oriented discount environment in which participants may achieve individually beneficial outcomes, but the system itself provides no investment inducement, no expectation of speculative gain, and no guarantee of favorable transactional results. The value realized by any participant depends solely on the independent decisions of buyers and sellers operating within the system's structured price-band framework.

What is claimed is:

1. A computer-implemented hybrid-offer stability system, comprising:

(a) a Feedback and Survey Interface configured to receive buyer satisfaction data;

(b) a Wallet API and a Token Usage Monitor configured to obtain vendor participation data associated with a participating vendor, the vendor participation data comprising wallet activity, transaction frequency, or participation in hybrid offers;

(c) an administrative/AI oversight layer including a computer-implemented Adaptive Coefficient Controller configured to:

(i) receive the buyer satisfaction data and the vendor participation data, (ii) adjust at least one of a transactional-satisfaction coefficient $r(t)$ or a supply-chain/adoption coefficient $\beta(t)$ based on the received data, and (iii) compute a price-band midpoint $P(t)$ for a hybrid offer based on $r(t)$ and $\beta(t)$, including the adjusted at least one of $r(t)$ and $\beta(t)$;

(d) a Search Engine Module and a Marketplace Escrow Account Ledger configured to apply the price-band midpoint $P(t)$ to the hybrid offer and to present the hybrid offer with the applied price-band midpoint $P(t)$;

(e) a Blockchain Ledger and a Coefficient History Database configured to record coefficient values, coefficient adjustments, and the price-band midpoint $P(t)$ associated with the hybrid offer, thereby providing historical traceability; and (f) a Buyer/Shopper App configured to display the hybrid offer using the applied price-band midpoint $P(t)$.

2. The system of claim 1, wherein the Adaptive Coefficient Controller is configured, when detected marketplace conditions indicate that appreciation of the price-band midpoint $P(t)$ is outpacing transaction growth, to apply moderated-slope adjustments by reducing one or both of $r(t)$ and $\beta(t)$ or by increasing token issuance.

* * * * *